United States Patent
Crossley et al.

(10) Patent No.: US 7,311,487 B1
(45) Date of Patent: Dec. 25, 2007

(54) APPARATUS AND METHOD FOR REPOSITIONING WAREHOUSE SHELVING UNITS

(76) Inventors: Eric Crossley, 16105 232nd St., Court East, Graham, WA (US) 98338; Steve Crossley, 18525 Old Sumner Buckley Hwy., Summer, WA (US) 98390

( * ) Notice: Subject to any disclaimer, the term of this patent is extended or adjusted under 35 U.S.C. 154(b) by 315 days.

(21) Appl. No.: 10/976,622

(22) Filed: Oct. 29, 2004

(51) Int. Cl.
*B65G 1/00* (2006.01)

(52) U.S. Cl. .................. 414/331.06; 414/430; 414/458

(58) Field of Classification Search ........... 414/331.06, 414/458, 430; 280/763.1, 766.1, 79.11; 211/151, 211/162, 191, 88.5; 254/89 R, 89 H, 423, 254/45, 90, 93 H, 2 B, 2 C
See application file for complete search history.

(56) References Cited

U.S. PATENT DOCUMENTS

| | | | |
|---|---|---|---|
| 2,314,129 A | 3/1943 | Daley | |
| 2,774,609 A * | 12/1956 | Winger | 280/79.11 |
| 2,841,247 A * | 7/1958 | Smalley | 254/9 B |
| 2,973,184 A * | 2/1961 | Trautman et al. | 254/2 B |
| 3,035,812 A * | 5/1962 | Wineteer | 254/2 R |
| 3,327,996 A * | 6/1967 | Morse | 254/2 R |
| 3,533,640 A | 10/1970 | Fator | |
| 4,178,006 A | 12/1979 | Johnson | |
| 4,210,341 A | 7/1980 | Minkoff | |
| 4,350,470 A | 9/1982 | Murillo | |
| 4,699,391 A * | 10/1987 | Syring | 280/79.11 |
| 4,934,893 A * | 6/1990 | Johnson | 414/458 |
| 5,044,864 A * | 9/1991 | Stefan | 414/459 |
| D340,337 S | 10/1993 | Beasley | |
| 5,486,014 A | 1/1996 | Hough | |
| 5,667,230 A * | 9/1997 | Riley et al. | 280/79.11 |
| 5,716,186 A * | 2/1998 | Jensen et al. | 414/458 |
| 6,095,537 A | 8/2000 | Cozza et al. | |
| 6,095,746 A | 8/2000 | Bergin | |
| 6,505,844 B2 | 1/2003 | Hallman et al. | |
| 6,939,098 B2 * | 9/2005 | Schults | 414/459 |
| 2006/0103091 A1* | 5/2006 | Northcutt | 280/79.11 |

FOREIGN PATENT DOCUMENTS

| | | |
|---|---|---|
| GB | 2278811 | 12/1944 |
| JP | 06304030 | 11/1994 |

* cited by examiner

*Primary Examiner*—Saul Rodriguez
*Assistant Examiner*—Joshua I Rudawitz
(74) *Attorney, Agent, or Firm*—Matthew W. Jellett; Hughes Law Firm, PLLC

(57) ABSTRACT

A warehouse palette rack repositioning assembly which can move a palette rack in its fully loaded state from one area of the warehouse to the other area of the warehouse. The warehouse pallet rack repositioning assembly can be installed onto a pallet rack by one workman. The assembly has a lifting unit and four wheeled skate units which provide the transportation means. The lifting unit is attached to the palette rack upright legs in the transverse direction, and a jack is used to actuate the lifting unit and lift the palette rack. The wheeled skate units are then installed underneath the palette rack uprights, with the pallet rack then being loaded onto the wheeled skate units for transportation.

17 Claims, 13 Drawing Sheets

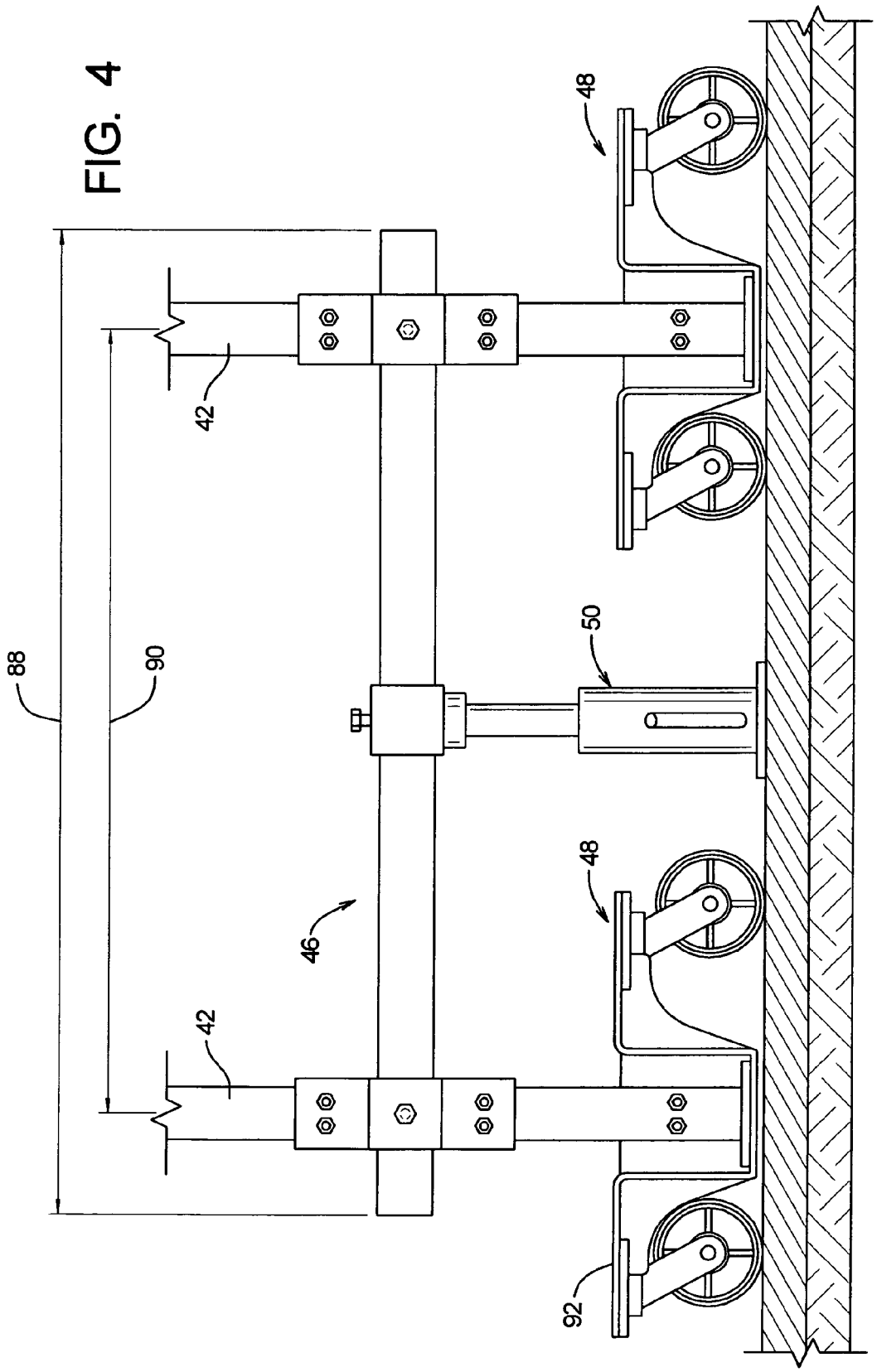

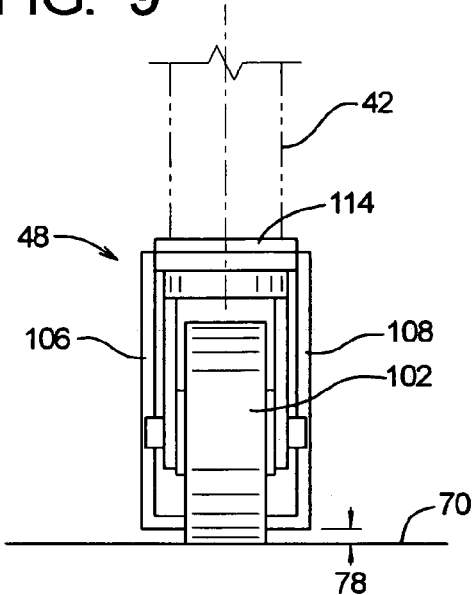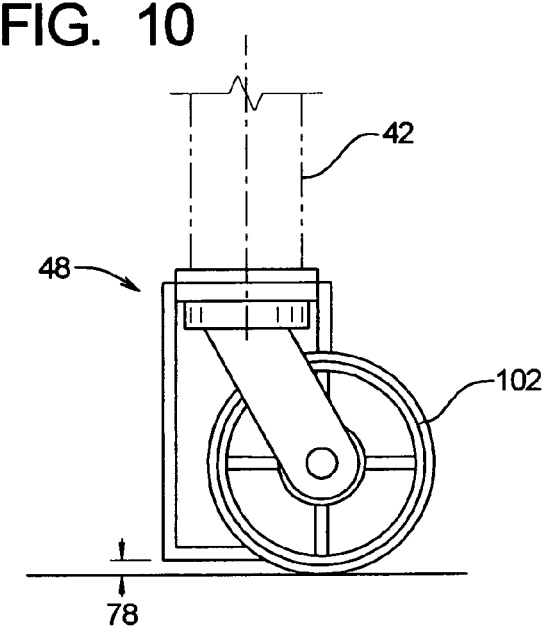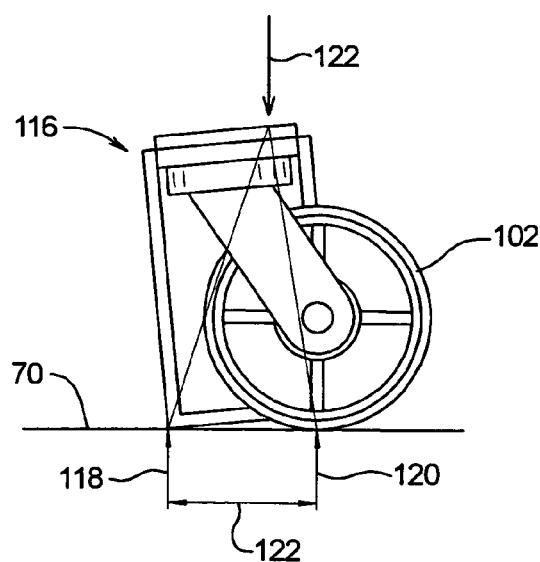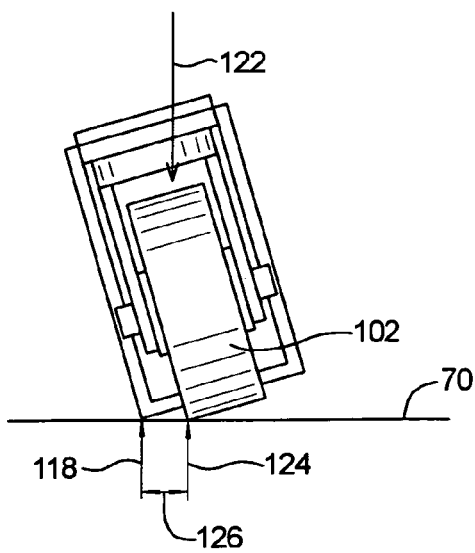

APPARATUS AND METHOD FOR REPOSITIONING WAREHOUSE SHELVING UNITS

BACKGROUND OF THE INVENTION a) Field of the Invention

With the advent of wholesale warehousing of consumer products including such stores as Sam's Club, Home Depot, and Costco, as well as the increased efficiencies in supplier side warehousing, the internal organization and reorganization of these large-scale facilities has become increasingly common. For example, Home Depot might have changing storage requirements depending on the season or based on changing consumer preferences. Thus, reorganization of the warehouse/store pallett racks occurs more often than in years past. To reorganize such a facility requires movement of the large-scale pallett racks which inhabit the warehouse and generally define the interior organization and aisles through which traffic occurs.

The palette racks themselves are generally 8 to 20 ft. in height and may be as long as 200 ft. in length or longer. Each palette rack has a bay of approximately 8 to 12 ft. in length with intermediate column or leg supports and generally three to four palette levels. These pallet levels or shelves are generally stocked with inventory 4 to 5 ft. in height. Thus the uniform weight per palette rack can range from 6,000 to 30,000 lbs. or greater depending on the density of the payloads and the length of each bay. Fully loaded, the racks themselves become semi-permanent structures within the warehouse/store, making reconfiguration of the store to accommodate changes in inventory extremely cumbersome. Thus in general, reconfiguring the store essentially requires a mini construction team to destruct and reconstruct the pallett racks. To do so the construction team must first remove the inventory from the palette shelves, then disassemble the palette racks and move both inventory and structure to the new location and lastly, reconstruct and reload the racks. Generally this store reconfiguration requires 5 to 10 crewmen and approximately 12 hours of continuous work, equating to approximately 120 man-hours in the most common scenario. Further, this reconfiguration must frequently occurr during the night hours so that the store can open for business the next day.

Thus, there is generally a need in the warehousing industry for a way to move and reconfige or reorganize the pallett racks and in the process reorganize the wholesale warehouse or store in the shortest and most efficient period of time, therefore reducing labor costs and business downtime. The following patents deal with apparatuses for moving various loads.

b) Background Art

U.S. Pat. No. 6,505,844 (Hallman) provides a door transporting and support system where the apparatus can be used for easily transporting and installing a door within a door jamb. The door transporting and support system comprises a base having a door receiving channel, a pair of first arms extending from the base, a pair of second arms extending from the base, with a plurality of caster wheels attached to the arms, with each caster wheel vertically adjustable by a threaded shaft. The base includes a pair of parallel side walls which define the channel. The height, angle, and position of the door within the base are determined by the vertical position of each threaded shaft.

U.S. Pat. No. 6,095,746 (Bergin) provides a motorcycle maneuvering apparatus where the apparatus is used for moving a motorcycle about in a cramped location. The motorcycle maneuvering apparatus comprises a front dolly member having a plurality of wheels, a pair of elongated frame sections which are conventionally supported upon the wheels, a pair of cross-member's spaced apart, interconnecting frame sections, a pair of elongate adjustable tire support members threaded upon the cross-members, and each including upright support members.

U.S. Pat. No. 6,095,537 (Cozza et al.) provides a plurality of dollies, each of which comprise a housing having upper and lower sides, a plurality of casters mounted on the lower side of the housing and a wall around each caster with each caster extending a predetermined distance beyond the respective wall. The top of the housing includes a means for engaging a rail extending down from a display case for supporting the display case. The casters are full swiveling and are sized in accordance with the load to be supported.

U.S. Pat. No. 5,667,230 (Riley et al.) discloses a rack lift assembly for transporting telecommunication equipment which includes a side mount plate connected to an equipment rack holding the telecommunication equipment. A caster plate is removably and rotatably connected to the side mount plates. The side mount plate has a latch bar to secure the caster plate in an operating position. The caster plate has a wheel to provide movement of the equipment rack holding the telecommunications equipment.

U.S. Pat. No. 5,486,014 (Hough) discloses a dolly constructed to support the bottom portion of one of a pair of vertical upright piano legs. The dolly includes an elongated narrow bottom wall and a pair of laterally spaced opposite sidewalls. The channel is open at its opposite ends and along its upper end for receiving the support leg. The dolly includes a pair of right angle flanges respectively connected and extending laterally outward in opposite directions from the upper edges of the sidewalls of the support member. The carriage also includes a plurality of caster wheels mounted to the flanges for rollably supporting the member.

U.S. Pat. No. 4,699,391 (Syring) discloses a recessed frame providing a low slung support which receives a gondola base member in a stable manner for repositioning gondolas in food stores and markets. Upright wall surfaces of the dolly prevent tipping of the gondola, while a resilient bottom surface of the dolly prevents accidental separation of the gondola base member and the dolly. Widely spaced caster wheels additionally contribute towards stable support of the gondola.

U.S. Pat. No. 4,350,470 (Murillo) discloses a compact three wheeled truck for use with vehicles having a flat or damaged tire. The truck secures the tire against forward movement. The ramp automatically pivots upward to a tire retaining position. The structure comprises a U-shaped frame of preferably tubular metal, the open end of the U being closed by a cross piece. Further, the single front wheel is a caster wheel mounted on an axle. Attached to the legs of the U-shaped frame is a cradle for the wheel to be carried by the truck. The cradle is a solid U-shaped member whose open end is substantially the same horizontal plane as the frame itself. Lastly, a ramp comprising two vertical sidewalls of scalene triangular shape, are connected by a rectangular top piece whose longer longitudinal sides are ribbed or perforated to save weight.

U.S. Pat. No. 4,210,341 (Minkoff) discloses a dolly device for moving hospital beds. Each dolly includes an elongated base-plate with a pair of swivel mounted casters attached to the bottom of the base-plate. Each caster includes a bracket attached to the base-plate by a faster where the caster and bracket can rotate around the fastener.

U.S. Pat. No. 4,178,006 (Johnson) discloses a furniture dolly with a horizontal frame and four swivel casters. The casters include spaced first and second side casters and third rearward caster, and fourth forward caster, where the third and fourth casters are mounted on the frame to contact the ground in the alternative allowing the frame to rock about the first and second casters. The frame includes a furniture receiving ledge with a horizontal shelf provided on the front side, and an upstanding backrest against which furniture can be placed.

U.S. Pat. No. 3,533,640 (Fator) discloses a pair of separate wheeled dollies where the load supported acts as the connecting means between the dollies. One of the dollies has non-castering wheels while the other has casters to permit the load to be guided accurately. The elongated body is an inverted channel section with opposite vertical bracket ends, attached to the top of each vertical bracket is a short horizontal channel. The wheels are arranged beneath the short horizontal channel thus permitting the wheels to maintain the load at a relatively low position to the ground making placement of the load onto the dolly relatively easy.

U.S. Pat. No. 2,314,129 (Daley) discloses a caster truck for use in moving stoves, refrigerators, pianos and other heavy articles. A base plate is formed in a triangular shape with vertical flange walls on the perimeter sides. Horizontal arms extend a short distance at the top portion of the flange, and extend horizontally from each of the three triangular points. Caster wheels are attached to the bottom face of the horizontal arms.

US D340,337 (Beasley) discloses a design for a dolly to move doors. The design has an inverted channel with two fixed wheels attached to the bottom plate of the channel.

GB 2278811 (Tsappi) discloses a trolley designed to hang a door. The base of the trolley is a horizontal rectangular plate having two opposed longitudinal sides and two opposed short lateral sides. The longitudinal sides are formed with upright tabs. Each tab terminates in the wing portion which projects outwardly away from the base to provide support for vertical caster legs. Each caster leg carries a caster wheel at its lower end.

JP 06304030 (Minami) appears to disclose a dolly system and apparatus for transporting cabinetry. The dolly has an upper portion and a lower portion. The upper portion fits slidably over the lower portion and sits on a spring-loaded shock system. The lower portion includes an inner chamber region encompassing the spring-loaded shocks as well as providing wheel wells for the caster wheels. Each dolly has two caster wheels.

BRIEF DESCRIPTION OF THE DRAWINGS

FIG. 4 is an end view of the pallet rack uprights similar to FIG. 3 but showing the wheeled units positioned transversely, FIG. 9 is a transverse elevational view of a wheeled unit attached to an upright, FIG. 10 is a transverse elevational view of the wheeled unit attached to an upright with the wheeled unit in a longitudinally turned position, FIG. 11 is a transverse elevational view of the wheeled unit in a wide base stationary position, FIG. 12 is a transverse elevational view of the wheeled unit in a narrow base stationary position.

DETAILED DESCRIPTION OF THE PREFERRED EMBODIMENTS

In discussing the environment in which the pallet racks are used, it is helpful to describe the typical warehouse storage facility and the facilities general used state.

Figure 1A:
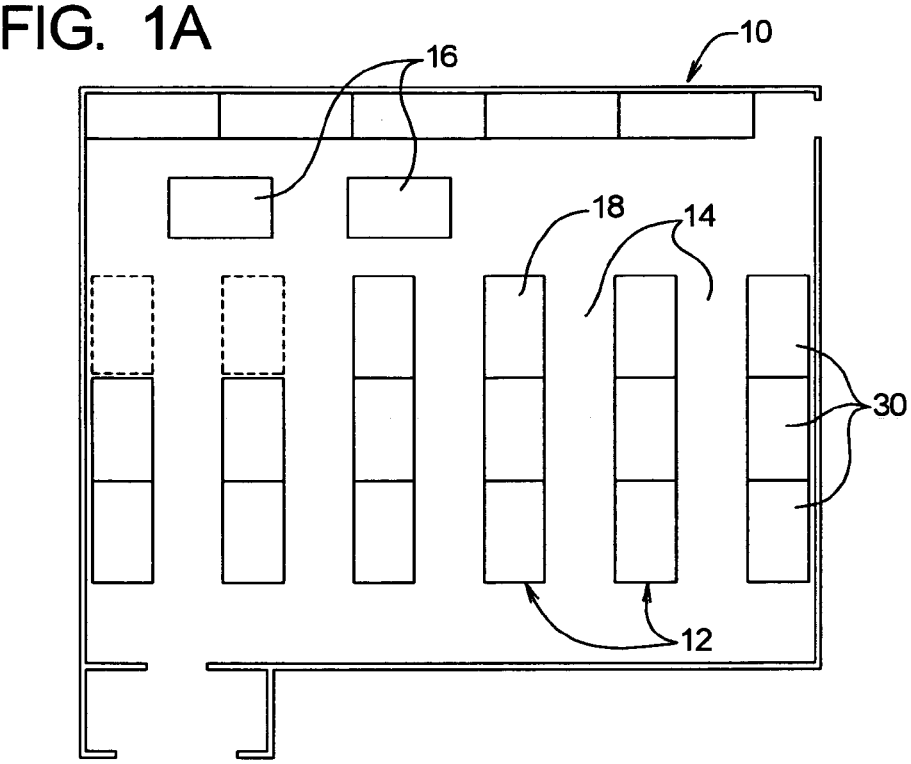
FIG. 1A is a plan view of an existing warehouse storage facility in its original state.

Therefore referring to FIG. 1a, a warehouse storage facility 10 is shown in plan view with a plurality of pallet racks 30 arranged in pallet rack rows 12 which form travel aisles 14 within the warehouse storage facility 10. As can be seen in FIG. 1a, the warehouse storage facility is in a pre-state of reorganization, with some repositioned pallet racks 16 already in place.

Figure 1B:
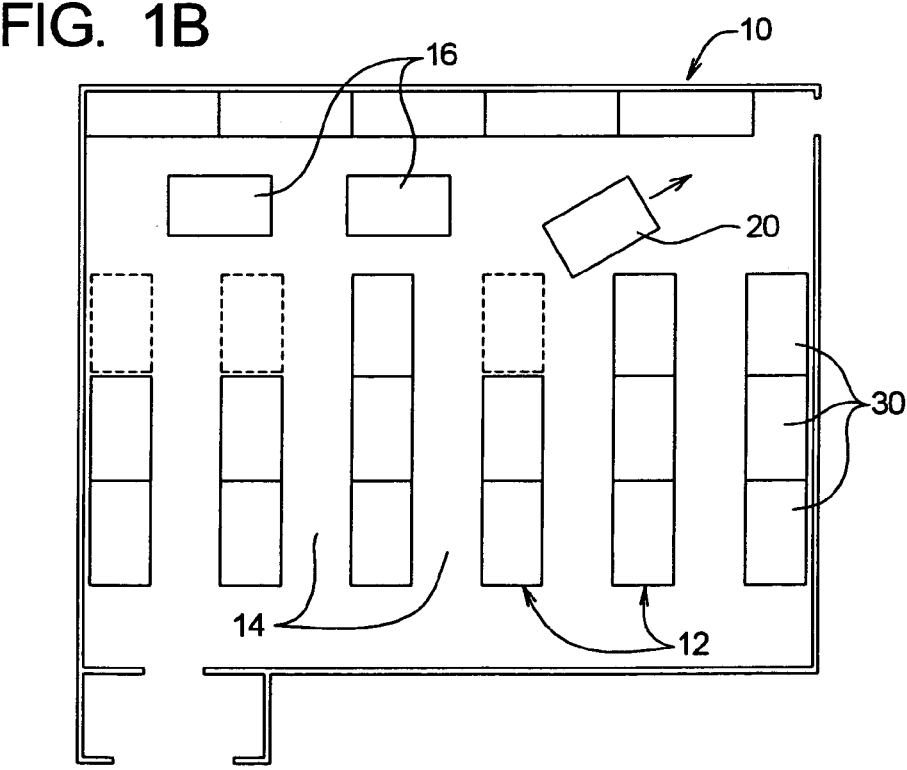
FIG. 1B is a plan view of the existing warehouse storage facility of FIG. 1A in a state of reorganization.
Figure 1C:
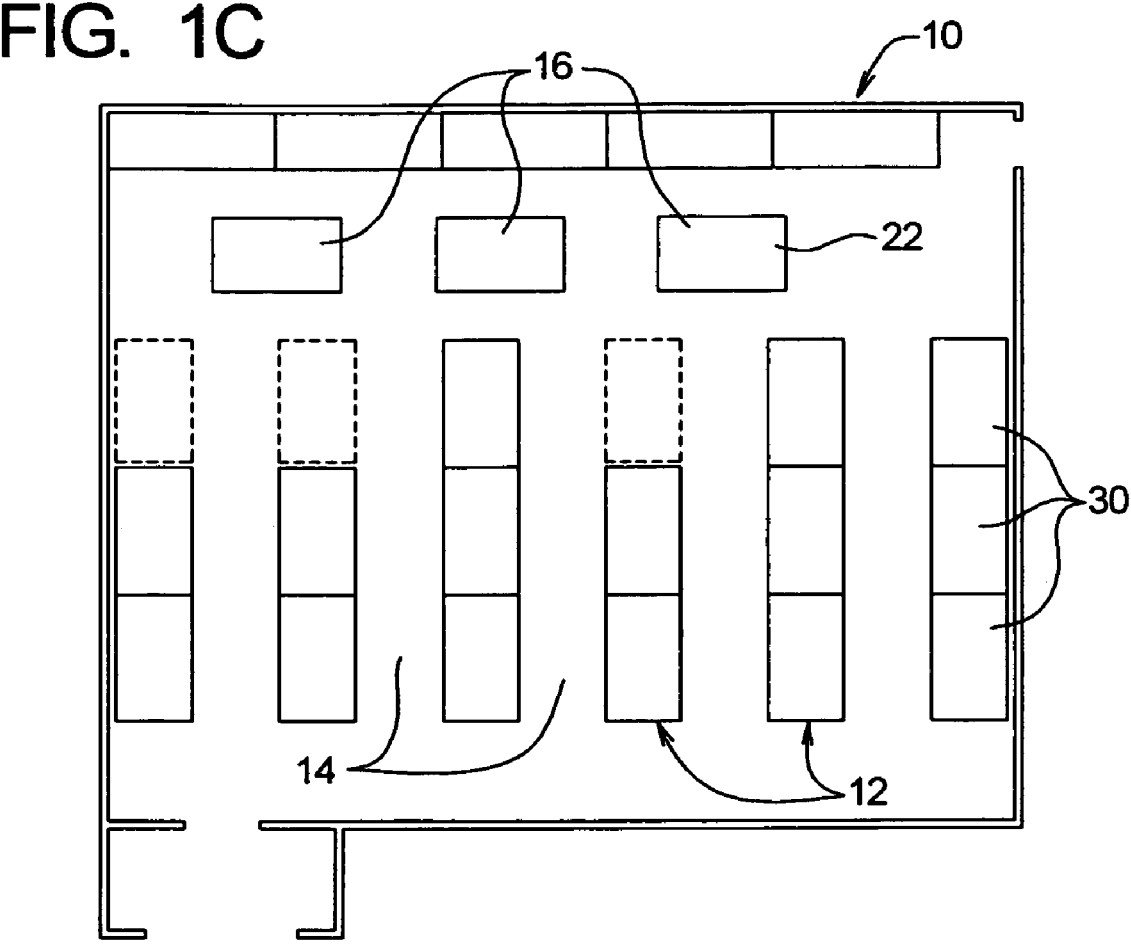
FIG. 1C is a plan view of the existing warehouse storage facility of FIGS. 1A & 1B in its reorganized state.
Figure 2:
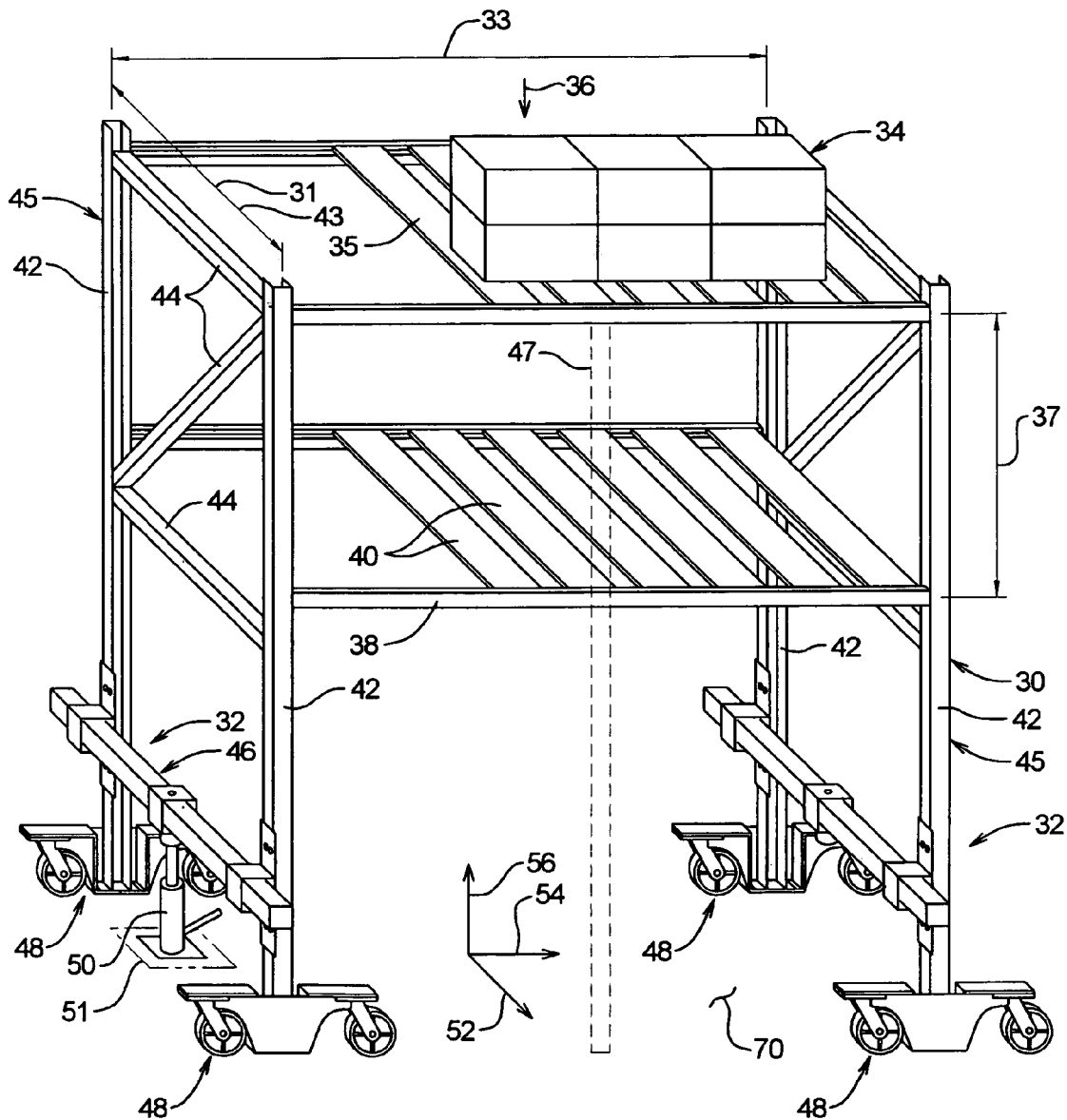
FIG. 2 is an isometric view of a typical pallet rack with a pallet rack repositioning assembly of one embodiment of the present invention attached thereto.

Describing the movements of a pallet rack from one location to another, the pallet rack is in an initial location 18 shown in FIG. 1a, and after the work crew enables the pallet rack to be moved, the pallet rack is in transit as shown in FIG. 1b in the transit position 20. FIG. 1c shows the pallet rack in its repositioned location 22 with the warehouse now completely reorganized. Referring now to FIG. 2, a typical pallet rack 30 is shown with a pallet rack repositioning assembly 32 installed.

Generally pallet racks have between two and four pallet rack shelves 35, with various payload 34 stored on the shelves. The load from the payload 34 is transferred along the rack joists 40 to the rack beams 38. The load then is transferred into the pallet rack uprights 42 and down into the base floor 70.

As an example, many times high-density materials such as Portland cement or other building materials can be stored on the pallet shelves 35. These high-density materials many times have a weight of around 90 lbs. per cubic foot. The pallet racks 30 will generally have a bay distance 33 from centerline of upright 42 to centerline of upright 42 in the longitudinal direction 54 of approximately 25 ft. The pallet rack shelving depth 31 from centerline of upright 42 to centerline of upright 42 can range from 2 ft. to 5 ft. in the transverse direction 52. The shelf height 37 can range between 4 ft. to 8 ft. depending on the configuration in the vertical direction 56.

Continuing the example, if a high-density material is stored as a payload 34 and the density material has a unit weight of 90 lbs. per cubic foot, and is stored approximately 2½ feet in height uniformly across the entire pallet rack shelf 35, using a shelving depth 31 of 5 ft., the uniform load bearing on the rack beam 38 is approximately 560 lbs. per linear foot with a resultant vertical dead load of approximately 3360 lbs. transferred into the pallet rack upright 42. If the pallet rack 30 has three pallet rack shelves 35 equally loaded then the total load bearing down on the floor 70 could be as much as 10,800 lbs. Of course the loads could be much heavier or lighter depending upon the structural capacity of the rack joists 40, the rack beam 38, and the corresponding rack uprights 42. With each upright 42 supporting the same 10,800 lb. load, the portability of the pallet rack is dependent upon the frictional resistance of the floor against the moving pallet rack upright base plates 86 as shown on FIG. 3.

Additionally, the palette racks 30 are generally designed to meet the local building code requirements for seismic loading, as well as the previously discussed storage loading requirements.

Historically, the transportation of the palette racks 30 as one unit from an initial location 18 to a second location 22 as shown in FIG. 1c, generally has been accomplished through the destructing and reconstructing of the palette racks 30.

To enable the palette racks 30 to be moved as an individual unit without destructing and reconstructing, the pallet rack repositioning assembly 32 is generally used.

Referring now to FIG. 2, the palette rack repositioning assembly 32 is comprised of two main components, a lifting unit 46 and a wheel unit 48. As is shown in FIG. 2, the lifting unit 46 is attached to a pair of palette rack uprights 42. These palette rack uprights 42 are generally arranged in a transverse pairing 43 and spaced accordingly along the longitudinal axis 54 of the palette rack 30, and are referred to as end support portions 45 or intermediate support portions 47.

The lifting unit 46 has been designed so that a single individual can install the lifting unit 46 onto the palette rack uprights 42. Further, the wheeled unit's 48 have been designed so that a single individual can lift and move the wheeled unit's 48 without the aid of another individual.

Figure 3:
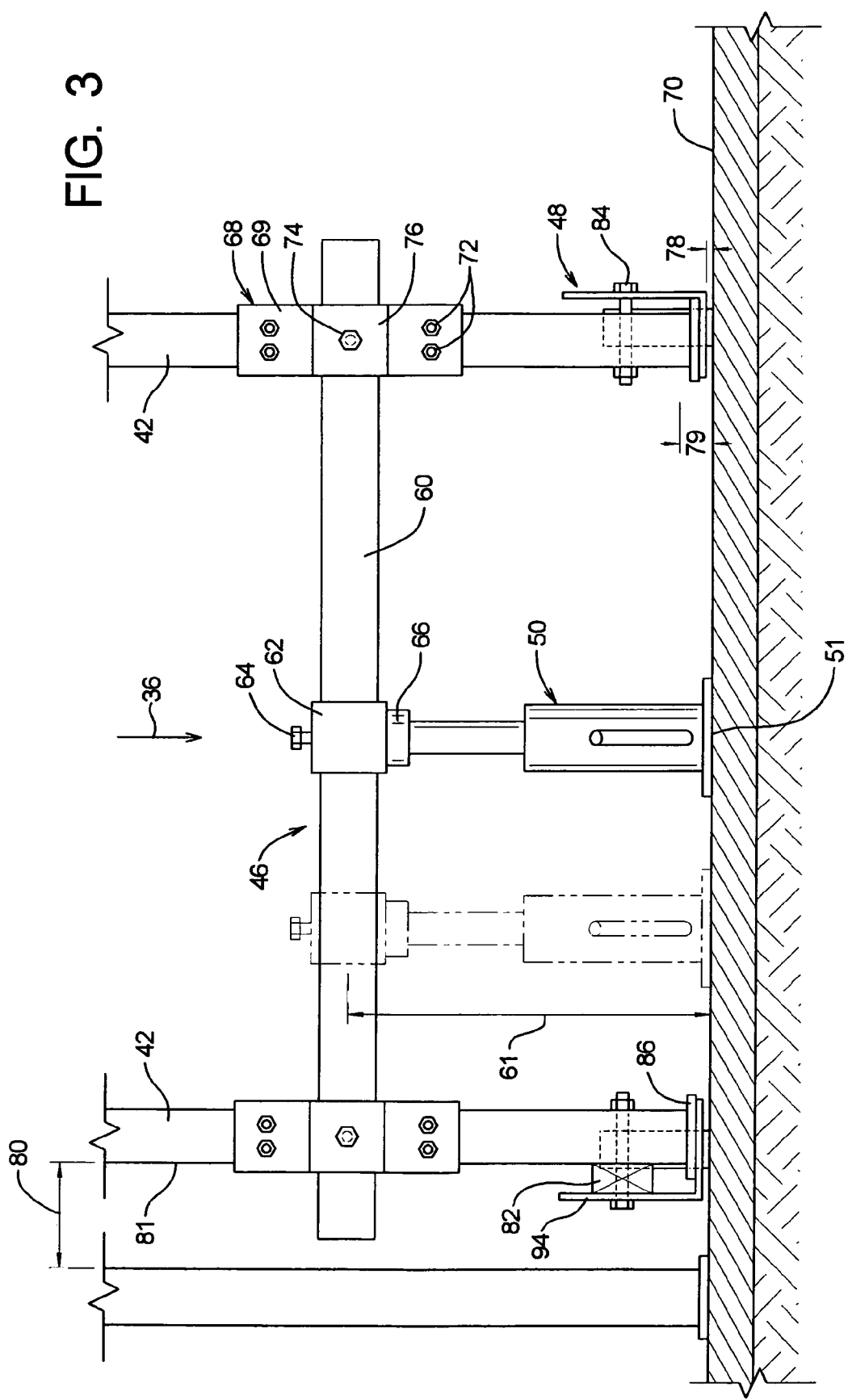
FIG. 3 is an end view of the pallet rack uprights connected to the pallet rack repositioning assembly with the wheeled units longitudinally aligned.

Referring now to FIG. 3, the transverse profile view of a support portion 45 is shown with the lifting unit 46 attached to the vertical uprights 42, as well as the wheeled units 48 installed underneath the base or baseplate 86 of the uprights 42.

In order to efficiently lift the uprights 42, the center of gravity 36 needs to be generally located within the transverse 52 and vertical 56 plane so that the lifting unit 46 can be arranged to safely lift the pallet uprights 42. The center of gravity 36 includes the payload weight 34 as well as the pallet rack 30 weight itself.

In discussing the positioning of the jack 50 and the load equalization sleeve 62 along the load carrying section 60 the user or operator of the pallet rack re-positioning assembly 32, will through trial and error need to establish the correct lifting location 51 as shown in FIG. 2 and FIG. 3 so as to lift the pallet rack uprights 42 located at the end portion 43 or the transversal pair 43 to be lifted.

Figure 13:
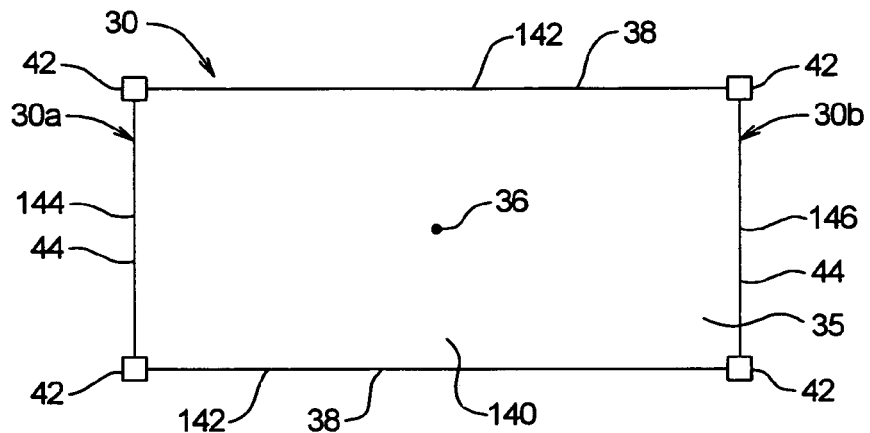
FIG. 13 is a plan top view of a typical palette rack prior to engaging the lifting unit and showing a first load carrying region.

Referring to FIG. 13 a plan view of a typical pallet rack 30 is shown. As discussed previously, the pallet rack 30 has, for discussion purposes, a front end 30a, and a rear end 30b, delineating the corners of this rectangular pallet rack 30 are the pallet rack uprights 42. Further, as discussed previously in FIG. 2, connecting the pallet rack uprights 42 are horizontal rack beams 38 running in the longitudinal direction, and pallet rack crossbeams 44 running in the transverse direction.

In the pallet rack 30 resting position prior to installation of the pallet rack repositioning assembly 32, the center of gravity 36 is shown substantially in the middle of the pallet rack plan view 30. As shown in the plan view, the pallet rack shelves 35 essentially define platform sections which carry the payload 34. The payload 34 is positioned arbitrarily within the pallet rack shelves 35. Thus, a first load carrying region 140 can be defined as being bounded by the longitudinal rack beams 38, and the transversal crossbeams 44.

The longitudinal rack beams 38 can also be considered the lateral delimiting line 142, and the crossbeams 44 can be considered the front delimiting line 144, and the rear delimiting line 146. Therefore, the first load carrying region 140 is bounded by the front delimiting line 144, the two lateral delimiting lines 142, and the rear delimiting line 146. The center of gravity of the load 36, for the current embodiment, rests squarely within the first load carrying region 140.

Figure 14:
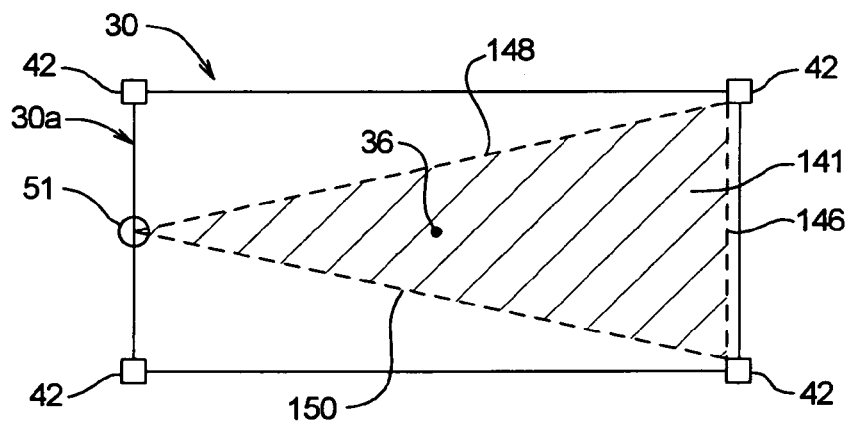
FIG. 14 is a plan top view of a typical palette rack during engagement of the lifting unit at a first lifting location and showing a second load carrying region.

When the user chooses a lift location 51 as shown in FIG. 14 and begins to raise the front end 30a, the load carrying region 140 is redefined by a series of lesser delimiting lines which bound a second load carrying region 141. These second series of delimiting lines include a triangular load region 141 which is defined by the vertexes located at the support points, the support points including the two remaining pallet rack uprights 42 and the new lift location 51. The second load carrying region 141 or the triangular load region is defined by a base 146, and two equal or unequal legs, a first leg 148 and a second leg 150. The base represents the base delimiting line 146, and the first leg represents the first leg delimiting line 148, and the second leg represents the second leg delimiting line 150. As long as the center of gravity 36 stays within this second load carrying region 141 then lifting of the front end 30A to install the wheeled units 48 should not cause tipping or significant torsion of the pallet rack 30. Any torsion of the pallet rack 30 could cause serious failure of the pallet rack 30 and its supporting payload 34.

Figure 15:
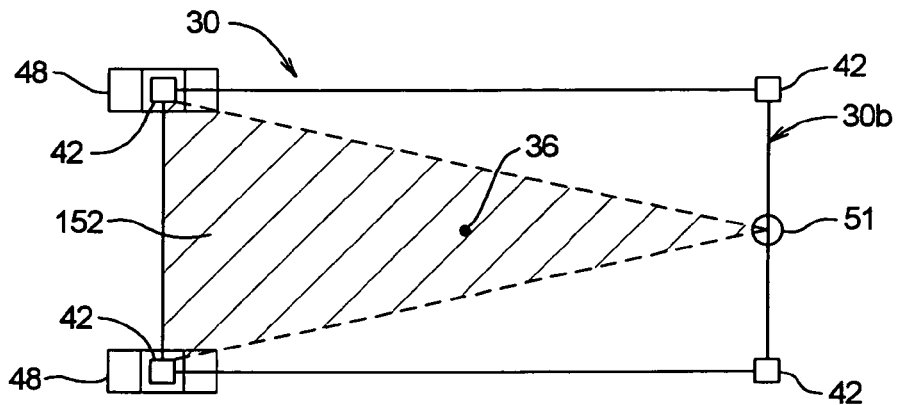
FIG. 15 is a plan top view of a typical palette rack during engagement of the lifting unit at a second lifting location and showing a third load carrying region.
Figure 16:
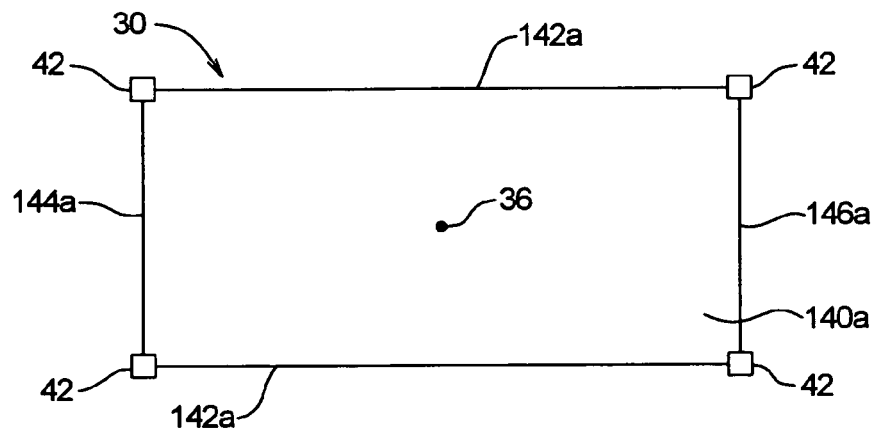
FIG. 16 is a plan top view of a typical palette rack prior to engaging more than one lifting unit and showing a first alternate load carrying region.

After the pallet rack uprights 42 have been lifted to the proper installation height 79 as shown in FIG. 3, and the wheeled units 48 have been installed, the pallet rack uprights 42 are subsequently lowered on to the wheel units 48 and then rest at the travel height 78. Next, the end portion or rear end 30B is ready for installation of the wheeled units. FIG. 15 shows the installation of the second set of wheeled units 48 underneath the pallet rack uprights 42 by choosing a lift location 51 at the rear end 30B. Thus a third load carrying region 152 is defined similarly to the second load carrying region 141, as a triangular area within which the center of gravity 36 should be located to avoid tipping of the rear end 30B An alternative configuration of the previously discussed load carrying regions includes FIGS. 16, 17, and 18. FIG. 16 shows the pallet rack 30 with a first alternative load carrying region 140a bounded by two longitudinal or lateral delimiting lines 142a and a front delimiting line 144a and a back delimiting line 146a. Again, the center of gravity 36 is well within the first load carrying region 140a and the payload 34 and the pallet rack 30 are in a stable position.

Figure 17:
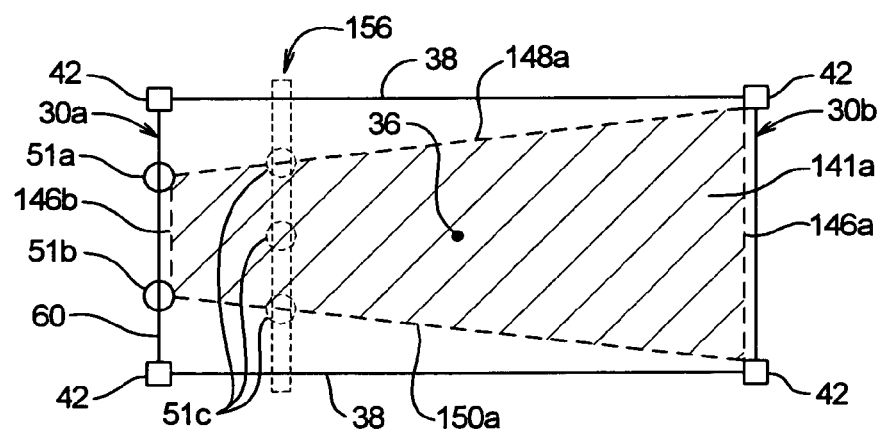
FIG. 17 is a plan top view of the typical palette rack during engagement of the lifting unit at a fourth and fifth lifting location and showing a second alternative load carrying region.

FIG. 17 shows utilization of two lifting locations 51a and 51b, the lifting locations 51a and 51b are positioned along the transversal axis of the load carrying section 60.

Although the load carrying section 60a is shown spanning from a pallet rack upright to pallet rack upright 42, it is conceived that the lifting unit 46 can be positioned at an alternative longitudinal location 156, where the load carrying section 60 spans between the pallet rack beams 38, and provides at least one if not two alternative lifting locations 51C.

By utilizing two lifting locations it is conceived that an even more stable lifting process of the front end 30 A. can be accomplished. Consequently, a second alternative load carrying region 141a is defined by a trapezoidal area where the trapezoidal area has a base delimiting line 146a and a top delimiting line 146b, with two nonparallel leg delimiting lines, including the first leg delimiting line 148a and the second leg delimiting line 150a. The base delimiting line 146a is bounded or defined by the two pallet rack uprights 42 at the back end 30b of the pallet rack 30. The top delimiting line 146B is defined by the two lifting positions 51a and 51b. The first leg delimiting line 148a is defined by the lifting position 51a and a corner pallet rack upright 42 located at the rear or back portion 30b. The second leg delimiting line 150a is defined as or by a second lifting location 51b and a second corner pallet rack upright 42 located at the back portion 30b of the pallet rack 30. Thus the installation of, or utilization of, two lifting locations 51A and 51B provides a more stable second load carrying region within which the user can be assured that the center of gravity 36 will be contained.

Figure 18:
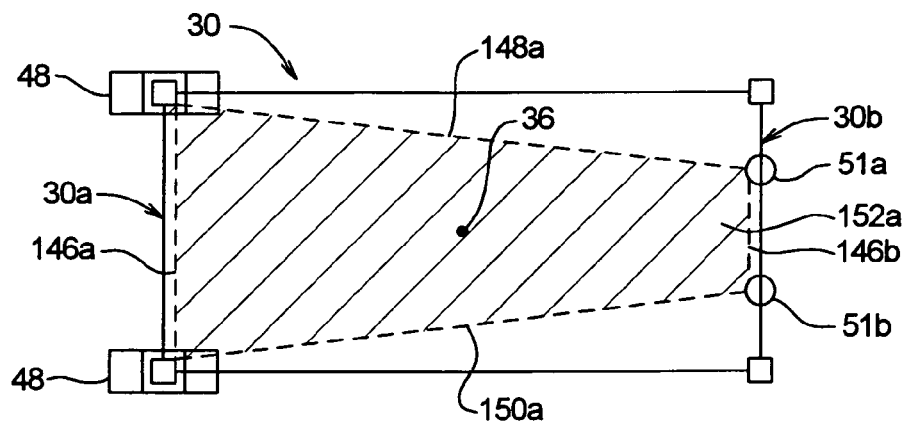
FIG. 18 is a plan top view of a typical palette rack during engagement of the lifting unit at a fifth and sixth lifting location and showing a third alternative load carrying region.

FIG. 18 shows a third load carrying region 152a, essentially a repetition of the second load carrying region 141a but this time showing the wheeled units 48 having been installed at the front end 30a and the lifting positions 51a and 51b located at the rear end 30b of the pallet rack 30. Similarly, the third load caring region 152a is bounded by a base delimiting line 146a, a top delimiting line 146b and two side delimiting lines 148a and 150a.

In the current environment a load carrying section 60 or frame member is arranged along the transverse axis 52 and is positioned at a stationary connection height 61. The load carrying section 60 can include steel beams, such as a steel I beam, a tube steel beam, a circular steel beam, a composite beam of some sort, or even a truss like member, but with the general overall goal of providing a load transfer from the uprights 42 into the jack 50 or other lifting mechanism.

Further, where the current embodiment shows one jack 50 to lift the palette rack uprights 42, it is conceivable that more than one jack 50 could be positioned along the load carrying section 60 to provide a more stable lifting operation. Further, it is conceivable that the jack 50 could be positioned at one upright 42 to lift the upright 42 the travel height 78 so that the wheeled unit 48 can be installed on the single upright 42. After installation of the first wheeled unit 48 the load equalization sleeve 62 along with the jack 50 could be moved to the other palette rack upright 42 to lift and install the second wheeled unit 48. The process as previously discussed would then show the wheeled unit 48 installed as shown in FIG. 3.

Still referring to FIG. 3, in the current embodiment the load carrying section 60 is a tube steel beam which has an axial bar length 88 greater than or equal to the shelving depth transverse distance 31 as shown in FIG. 2 or the upright transverse spacing 90 as shown in FIG. 4. By providing a longer beam length 88, the lifting unit 46 can be utilized on pallet racks 30 of upright transverse spacing 90 greater than or less than the embodiment currently shown.

Many times the pallet racks 30 will be positioned back to back within the warehouse storage facility 10. In such situations, a standard spacing between the back portions 81 of the pallet racks 30 is specified. This standard spacing is referred to as a flu space 80 and is generally a distance of approximately 6 in., a standard distance within the warehousing industry.

The connection for attaching the lifting unit 46 to the palette uprights 42 is a connection section or palette upright attachment 68. In the current embodiment this upright attachment 68 has two main components. The first is a connection or attachment plate 69, and the second is a tube steel bar sleeve upright attachment 76. Both the attachment plate 69 and the bar sleeve 76 are composed of a common grade steel material.

The bar sleeve 76 in the current embodiment is essentially a tube steel member with an inner dimension just greater than the load carrying tube steel member 60. The bar sleeve tube steel member 76 is configured to allow the load carrying tube steel member 60 to slide freely through the bar sleeve tube steel member 76 along the previously mentioned transverse axis 52.

Figure 5:
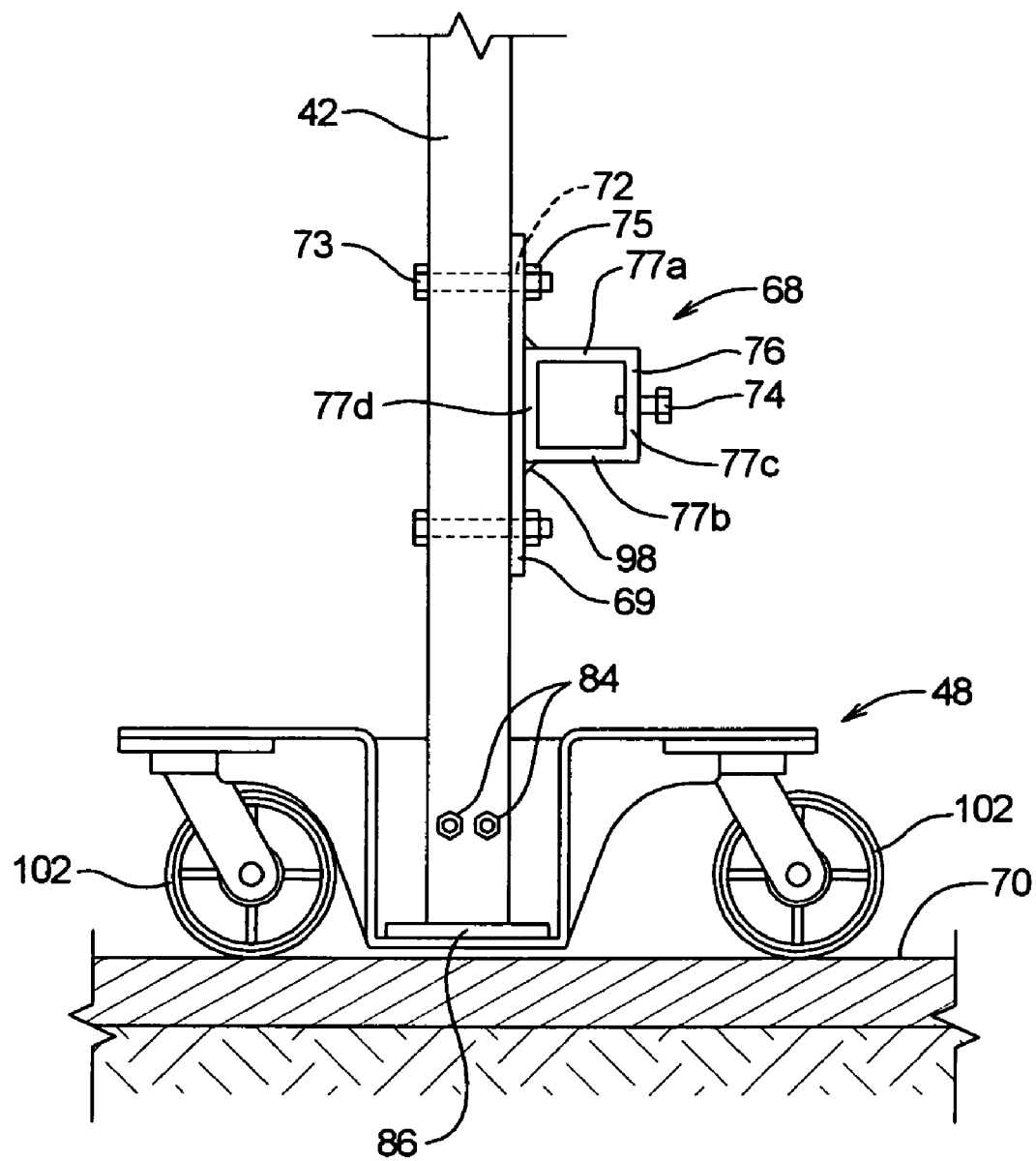
FIG. 5 is a side elevational view of one of the wheeled units attached to the upright.

Referring to FIG. 5, the connection bar sleeve 76 has four main walls which comprise the structure. An upper wall 77a, a lower wall 77b., an outside wall 77c, and an inside wall 77d. The inside wall 77d is positioned against the attachment plate 69 at a location substantially center within the attachment plate 69. The attachment plate 69 and the bar sleeve 76 are connected together by a fillet weld 98 with enough capacity to transfer the upright 42 load into the load carrying section 60.

Referring to FIGS. 3, 4, and 5, the attachment plate 69 has a plurality of through bolt openings 72, the through bolt opening spacing corresponding to openings within the palette upright 42 structure which allow a through bolt 73 to extend through the attachment plate 69, through the upright 42, and out the back of the upright where a nut 75 fixes and secures the through bolt 73 in position.

Enough through bolts are provided to allow for load shear capacity transfer from the upright 42 into the attachment plate 69, thus securing the attachment of the lifting unit 46 to the uprights 42. Although the current embodiment utilizes through bolts 73 and a connection plate 69 as the general means of attachment to the upright 42, it is generally perceived that other common standard construction connections can be utilized such as a permanent weld of the attachment plate 69 to the upright 42.

Figure 3A:
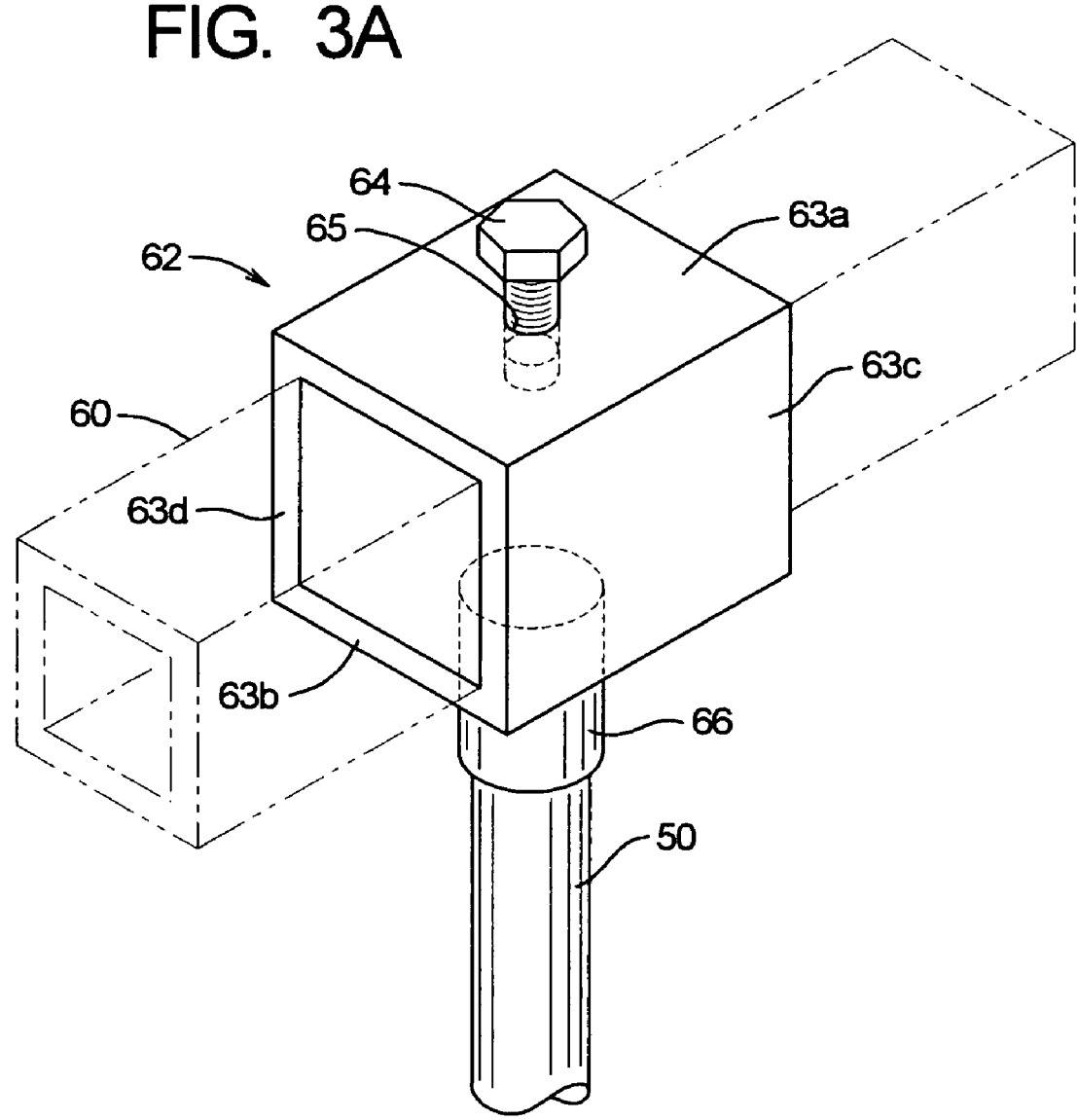
FIG. 3A is an isometric view of the load equalization sleeve on the load carrying section.

Still discussing the construction of the lifting unit 46, and referring to FIG. 3a, the load equalization sleeve 62 in the current embodiment, is a tube steel member with an inner dimension just greater than the outer dimensions of the tube steel load carrying section 60. This allows the load equalization sleeve 62 to be adjusted accordingly along the tube steel load carrying section 60 and positioned substantially in line with the center of gravity 36.

Still referring to FIG. 3a, the equalization sleeve 62 includes a bottom wall 63b, a sidewall 63c, and an opposing sidewall 63d. Positioned substantially in the center of the bottom wall 63b of the load equalization sleeve 62, is a jack securing device 66, which in the current embodiment is a hollow cylindircal steel member of approximately 2 in. diameter, with a length of approximately 2 in. The jack cup 66 is attached to the bottom wall 63b of the load equalization sleeve 62 through the use of the fillet weld.

The load equalization sleeve 62 can be fixed in a temporary position along the load carrying section 60 by utilizing a set screw 64, which in this current embodiment is a threaded bolt feeding into a threaded opening 65 of the tube steel load equalization sleeve 62. The threaded opening 65 in the current embodiment is positioned substantially in the center portion of the equalization sleeve top wall 63a, with the remainder of the structural walls composing the equalization sleeve 62 located at the general quadrant points.

In operation, and referring to FIGS. 2, 3, 3A, 4, and 5, to install the lifting unit 46 so as to prepare the pallet rack 30 for lifting, the user generally will first determine the correct stationary connection height 61, and then install the connection upright attachment 68 in this current embodiment to the pallet upright legs 42. The user will acquire, in this current embodiment, 4 half-inch diameter through bolts with substantial length to pass through the connection plate 69 as well as the upright leg 42 and allow enough thread length at the end to attach the nut 75. The user will position the connection upright attachment 68 at the stationary connection height 61 and tighten or insert the through bolts through the attachment plate 69 as well as through the corresponding upright 42 and secure the nut to the through bolt 73. For each pallet upright leg 42 the upright attachment 68 will be connected. With the upright attachments 68 installed, the user can then insert the load carrying section 60 which in this embodiment is a tube steel member, through the connection bar slave 76. The load carrying section 60 will thus be spanning between the pallet uprights 42 in the transverse direction. Additionally, the user will need to install the load equalization sleeve 62 during the installation of the load carrying section 60 through the connection bar slaves 76. With the position of the load carrying section 60 at the desired stationary connection height 61 as well as the desired transversal span distance, the user can then selectively tighten the upright attachment sleeve set screw 74 to fix the load carrying section tube steel member 60 to the pallet uprights 42. Next, the user will make an educated guess as to the general location of the center of gravity 36. In this instance, the center of gravity 36 is likely at the mid span of the load carrying section 60. Thus, the user will secure the load equalization sleeve 62 against the load carrying section 60 by utilizing the threaded set screw 64. With the lifting unit 46 secure, a jack 50 can be inserted below the load equalization sleeve 62 and into the jack cup 66 or containment region 66 for the jack 50. The user will then begin to apply vertical pressure to the lifting unit 46 through the use of the jack 50 and thus begin to raise the pallet rack uprights 42 to a desired insulation height 79. At this point, the wheeled units 48 can be installed.

A detailed discussion of the wheeled unit 48 will now be provided by referring to FIGS. 5, 8, 9, 10, 11, and 12. In the current embodiment, the wheeled unit 48 is constructed with two castor wheels 102, each of which have as standard in the industry a pair of forks 103 as well as a top stay 105 with an axle 107 which connects the wheel 102 to the forks 103. In the current embodiment, the wheel 102 has a diameter of approximately 6 in. The frame of the wheeled unit 48 is constructed around a longitudinal, transverse, and vertical axis with the castor wheels 102 being spaced approximately 2 ft. from center line of top stay 105 to center line of top stay 105.

The wheeled unit 48 is comprised of parallel vertical plates running in the longitudinal direction, as well as parallel horizontal top and bottom plates running in the longitudinal direction. The parallel vertical plates are positioned in the front and back portions of the wheeled unit 48, the back vertical plate or back gussett plate 106 as well as the front vertical plate or front gussett plate 108.

Figure 8:
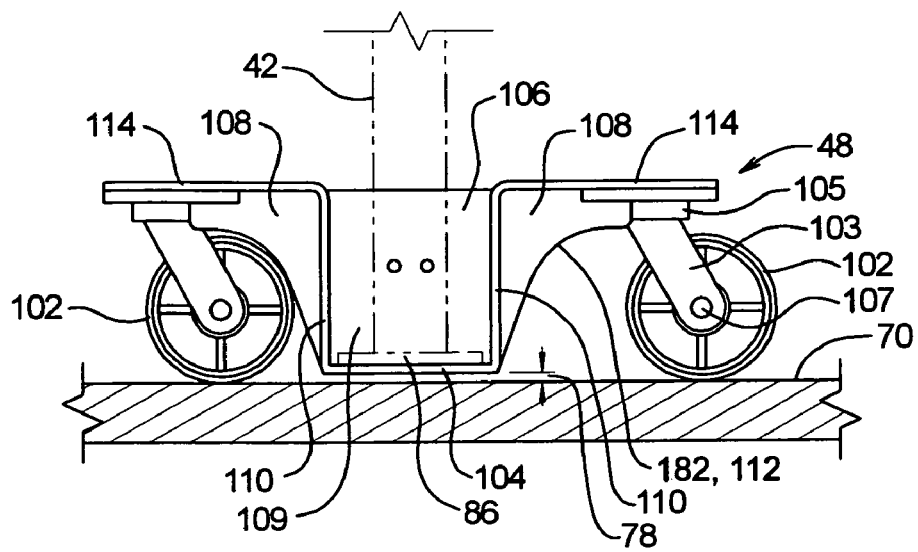
FIG. 8 is a longitudinal elevational view of a wheeled unit.
Figure 8A:
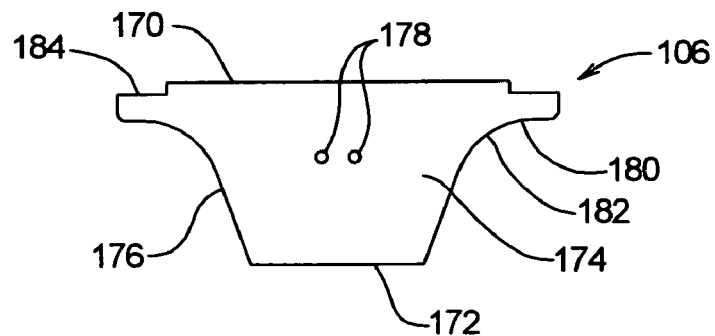
FIG. 8A is a profile detail view of the wheeled unit back gusset plate.

Referring to FIG. 8a, the back gussett plate 106 in the current embodiment is comprised of half-inch steel rectangular plate with a top edge 170, and bottom edge 172, and side edges 176. The back gussett plate 106 is configured as a modified trapezoidal shape with the long edge being the top edge 170, having a longitudinal length of approximately 2 ft., the short edge or bottom edge 172 having a longitudinal length of 9½ inches, with the vertical height of the trapezoidal plane approximately 10 inches, centered in the vertical plane both longitudinally and vertically are two ½-inch diameter connection holes 178 spaced approximately 1⅜ of an inch center to center. The side edges 176 are cut along a radius 182 substantially configured to form a caster wheel well 180 allowing the caster wheel 102 to pivot 3600 in the horizontal plane. The back gussett plate 106 has a transverse thickness of approximately one half inch. The wheel well radius 182 in the current embodiment is shown as approximately 5½ inches.

The gussett plate top edge 170 is provided with a seat section 184 which is ¾ inches deep by 2¾-inches long notch for the caster wheel top stay 105 to be positioned. This notch is mirrored longitudinally at the other end of the gussett back plate top edge 170.

Referring back to FIG. 8, centered in the vertical plane of the back gussett plate 106 is a load well 109. The load well 109 is provided as a recessed containment seat for the pallett rack upright 42 base plate 86 to sit during transportation. The load well 109 is comprised essentially of a three sided volume with the back portion of the load well 109 being defined by the back gussett plate 106, and the other two vertical surfaces being defined by load well side plates 110 which are themselves steel plates that run the vertical height of the back gussett plate 106 and have a transverse length of approximately 5 in. The load well side plates 110 also have a wall thickness of approximately ½ inch. Defining the base of the load well 109 is a load well bottom plate 104 which is configured as a rectangular steel plate in the current embodiment with three of the plate edges secured to the bottom edges of the two load well side plate 110 and the bottom edge 172 of the back gussett plate 106. The connection of the load well bottom plate 104 to the side plate 110 and back plate 106, in the current embodiment is provided as a full fillet weld along the entire length of the connected edge of the load well bottom plate 104. The load well bottom plate 104 has a wall thickness of at least one half-inch.

Connected to the top edge of the load well side plate 110 are the wheeled unit top plates 114. the wheeled unit top plates 114 are rectangular in shape with a longitudinal length of at least 1 ft. and a transverse width of at least 5 in. The wall thickness of the plate 114 is at least one half-inch. The top plate 114 is connected to the load well side plate top edge as well as the back gussett plate top edge. In the current embodiment the connection is secured through a fillet weld.

Figure 8B:
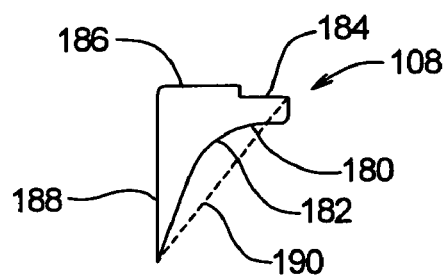
FIG. 8B is a profile detailed view of the wheeled unit front gusset plate.

Referring to FIG. 8b the front gussett plate 108 is configured as a modified triangular shape with a top leg edge 186 and a side leg edge 188 with the hypotenuse edge 190 modified to fit the radius 182 of the caster wheel well 180. The front gussett plate 108 as a wall thickness of approximately one half-inch with the top leg edge longitudinal length of approximately 10 in. and the side leg edge 188 also 10 in. in the vertical length. The top leg edge 186 is configured to connect to the longitudinal edge of the top plate and the side leg edge 188 is configured to connect the load well side plate 110 vertical edge at the forward portion of the wheeled unit 48. The front gussett plate 108 also has a notch 184 with a longitudinal length of 2¾ inches and a seat depth of ¾ of an inch provided for the seating of the top stay 105 of the caster wheel 102. The front gussett plates 108 are connected along their edges with a fillet weld.

Thus the wheeled unit 48 stands with a vertical height of 11 in. from the top plate 114 to the base surface 70. The depth of the load well 109 is 10 in. from the top plate 114 to the top edge of the load well bottom plate 104. Consequently, this leaves a ½-inch travel height 78.

During operation, after the lifting unit 46 has raised the uprights 42, the wheeled units 48 can be installed. As shown in FIG. 3 and FIG. 8, a wheeled unit 48 can be inserted in between the pallet upright legs 42 within the flue space 80 thus mitigating any pre-movement requirements of the entire pallet rack 30 to make room for installation of the wheeled units 48. With the uprights 42 positions at the insulation height 79, the insulation height 79 being approximately 1 in., the wheeled units 48 can have the upright 42 inserted into the load well 109, with the upright base plate end 86 positioned to sit on the load well bottom plate 104.

In the event of an eathquake or major catastrophic event, the upright and can be secured to the back gussett 106 as a safety precaution, by utilizing, as is shown in this embodiment, two upright securing bolts 84 which have a diameter of at least ⅜ of an inch, so that they can pass easily through the upright 42 and also through the back gussett plate securing holes 178. The upright securing bolts have a transverse length to provide a threaded end portion to stick out if the back gussett plate 106 and accept a washer and nut.

Many times the upright 42 will have a base plate 86 which has a transverse length deeper than the transverse depth of the load well 109. Consequently an offset spacer 82 is required to secure the upright 42 to the wheeled unit 48 so that the off-center upright load does not tip the wheeled unit 48. In this embodiment, the offset spacer 82 is formed from a 2×4 stud.

Therefore, the upright securing bolts 84 will adequately secure the wheeled unit 48 to the upright leg 42 and thus avoid displacement of the upright leg 42 from the wheeled the unit 48 during an eathquake or similar catastrophic event.

Once all of the wheeled units 48 have been installed, the pallet rack 30 can then be relocated to the second location. During this transfer the lifting unit 46 is either removed from the pallet rack upright 42 or left in place during transfer for ease of unloading. Thus, the center of gravity 36 having been located adequately during the previous installation, making the unloading of the pallet rack 30 from the wheeled units more efficient.

Figure 6:
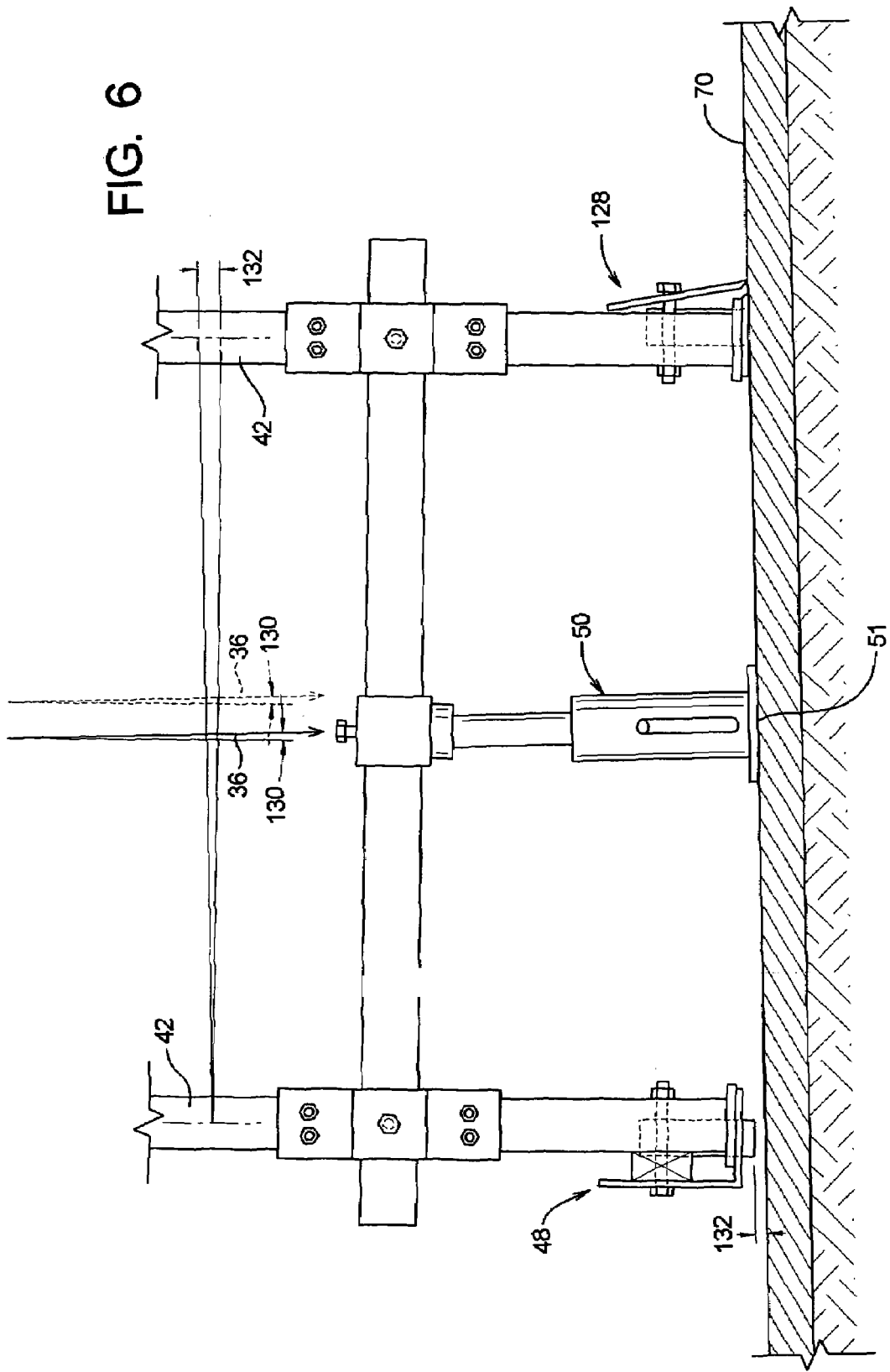
FIG. 6 is an end view similar to FIG. 3 but with a failed wheel unit shown during palette rack repositioning assembly installation.
Figure 7:
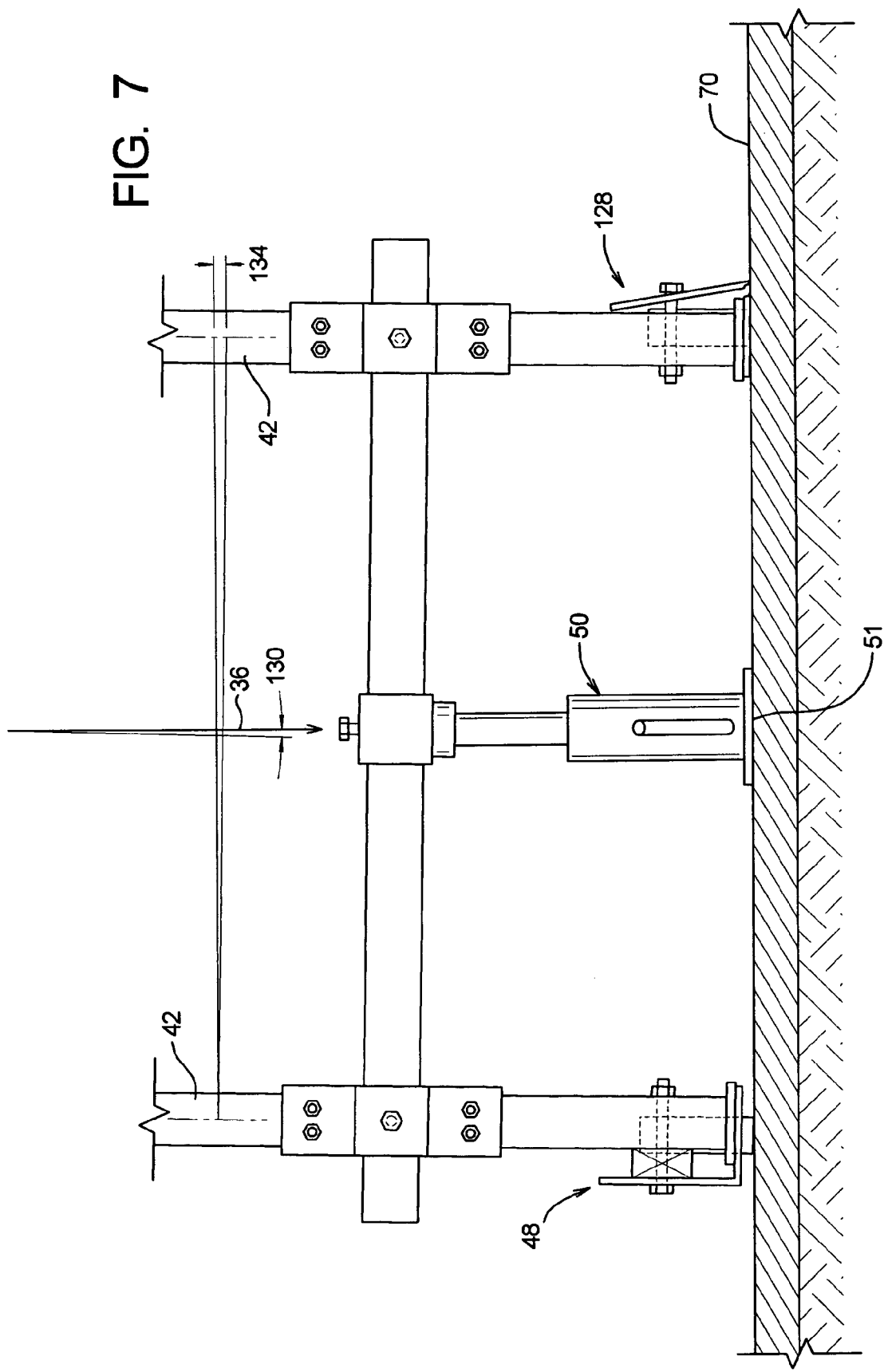
FIG. 7 is an end view similar to FIG. 3 but with a failed wheel unit below a pallet rack upright.

Referring now to FIGS. 6, 7, and 8, it is possible that during transporting, loading or unloading of the pallett rack 30 from the wheeled units 48, the wheeled unit 48 may experience a catastrophic failure due to overloading of the wheeled unit or the like, a failure where the connection fillett weld between the load well base plate 104 and the load well sideplate 110 and back gussett plate 106 separate causing the pallet rack 30 to rest at a tilted angle 130.

Referring to FIG. 7, the failure occurs during transportation of the pallet rack. Because of the low travel height 78, such as a travel height of ½ inch, the pallet rack upright 42 will only fall a short distance, and the center of gravity 36 may only be off-center by a minimal amount due to a shifting of the load. Therefore, the pallett rack 30 could be resting at a slope of approximately 1 in. rise to 144 in. run assuming that the transverse upright spacing distance 31 shown in FIG. 6 is approximately 6 ft.

Because of the small shift in load, the center of gravity 36 as shown in FIGS. 13 through 18 is likely to stay within one of the load regions 140. Additionally, the rack crossbeams 44 as seen in FIG. 2 are likely to provide some transverse plane stiffness to avoid overturning of the pallet rack 30.

As seen in FIG. 6 a failed wheeled unit 128 has is shown during the installation process where the jack 50 is still in its installation position 51. The center of gravity 36 has shifted to one side of the pallet rack 30 but is still within the load region 142.

The transversely opposite wheeled unit 48 has been lifted off of the base surface 70 to a lifted position 132 which happens to be approximately two times the travel height 78 due to the cantelevered nature of the installed jack between the support points, thus creating a shortened transverse distance 31. Even during this worse case scenario, the pallet rack 30 is sitting at a low rise to run slope of 1 to 72, and the center of gravity will be well within load region 140 tolerances.

During transportation of the pallett rack 30, the wheeled unit caster wheels 102 may need to be orientated so that the pallett rack can be moved perpendicular to it's then current position.

Referring to FIGS. 9 & 10, The caster wheel 102, connected to the wheeled unit 48, is shown in profile with the caster wheel 102 positioned in the longitudinal or forward direction. The upright 42 is positioned within the load well 109, enabling the upright 24, and wheeled unit 48 to work in tandem. With the caster wheel 102 positioned along the longitudinal axis, the pallet rack 30 can be moved by one or two individuals in the longitudinal direction.

During such a move, the logistics may require that the pallet rack 30 make a turn out of the longitudinal direction. In such an instance, the pallet rack 30 may need to stop it's forward momentum, and the individuals or users moving the pallett rack 30 can turn the caster wheels 102 in the desired movement direction.

FIG. 10 shows an example of such a caster wheel 102 rotated into the transverse direction so that the pallet rack 30 can be moved perpendicular to the current longitudinal position.

After the wheeled units 48 have been uninstalled from the pallet rack uprights 42, the user can lift one of the wheeled units 48 which weigh approximately 75 lbs. and place it to one side for future use. FIG. 11 shows the wheeled unit 48 standing in a self supporting position or stationary position 116.

The wheeled unit center of gravity 122 along the longitudinal axis such that it is resisted by the wheeled unit 48 being in contact with the base surface 70 in what is described as a kick stand position. This kick stand position 116 has a wide stationary base support 122 where the caster wheel 102 is orientated in the transverse direction. The tangential point 120 between the caster wheel 102 and the base surface 70 along with the load well bottom plate corner 118 provide at least two resting points within which the wheeled unit center of gravity 122 can be resisted. Thus the wheeled unit 48 can be placed off to one side in a standing or kick stand position 116 and not be a hazard for falling over on an individual or passerby.

FIG. 12 shows a similar configuration as FIG. 11 but with the center of gravity 122 of the wheeled unit 48 being resisted by a narrower stationary base 126 which is defined as the same load well bottom plate corner 118 in contact with the base surface 70 as well as the caster wheel 102, being orientated along the longitudinal direction and thus the tangential points of the caster wheel is along the caster wheel edge 124. With the caster wheel edge in the longitudinal direction parallel with the bottom plate corner 118 this provides a lesser stationary base 126 in the transverse direction but does provide enough stability for the wheeled unit 48 to stand in a self supporting position.

With the pallet rack 30 moved, the lifting unit uninstalled, and the wheeled units stored, the pallet rack transportation and lifting assembly is ready for another use.

We claim:

1. An assembly to move a load carrying structure over a base surface from a first location to a second location, the load carrying structure having a longitudinal axis, a transverse axis, and vertical axis, a first and second structure end portions, said end portions spaced along the longitudinal axis, a load carrying platform section with one or more load carrying platforms, the load carrying platform section having a front end portion, a rear end portion, arranged around the longitudinal, transverse, and vertical axis, each structure end portion having first and second support members, said first and second support members of each structure end portion being at the corresponding first and second transversely spaced base support locations, said platform section having a first load carrying region bounded by lateral, front, and rear delimiting lines which coincide generally with vertically upward projections of two longitudinally extending lines from the first base support locations to the second base support locations, said platform section carrying a load or loads positioned so that the load carrying structure and the load or loads collectively have a center of gravity which is within said load carrying region, said first and second support members engaging said base surface at the base support locations to support the loads held within the load carrying region, in its base engaging position the assembly comprising:
   a. at least four wheeled transport units, a first two wheeled transport units of which are arranged to be positioned at two transversely spaced transport positions corresponding to said first structure end portion, and a second two wheeled transport units of which are arranged to be positioned at two transversely spaced transport positions corresponding to said second structure end portion;
   b. said wheeled transport units being arranged so that with the four wheeled transport units located in their transport positions and bearing against the base surface, the load carrying structure is in a transport position with the first and second support members of each of the first and second structure end portions being out of contact with the base surface;
   c. a lifting component comprising at least a first and second lift unit, said lifting component being arranged in a manner that with the support structure being positioned with both of the first support members and both of the second support members engaging the base surface, said first lift unit or said second lift unit is able to be positioned at either the first and second structure end portions to raise that structure end portion to a first higher level where the related two wheeled transport units can be located in the transport locations or removed from the transport positions, and the lift unit can be lowered so that the lift unit can be removed from either of the first and second structure end portions with the structure being in either its transport position or its base engaging position.

2. The assembly according to claim 1 wherein each wheeled transport unit is further comprised of at least two castor wheels, a wheel load distribution section, a load well, and a top connecting plate, the at least two castor wheels engaging said base surface and connected to the top connecting plate, the top connecting plate connected to the wheel load distribution section, the wheel load distribution section connected to the load well, whereby the load well is adapted to carry one of said end portion support members in said transport position and further adapted to transfer the load from said support member into said load distribution section, the load distribution section further adapted to distribute said load equally between the at least two castor wheels, the at least two castor wheels adapted to transfer the load into said base surface.

3. The assembly according to claim 2 wherein the wheeled transport unit is further comprised of:
   a. the load well having a load well bottom plate, a plurality of load well side plates, each load well side plate having:
   b. a structural thickness of at least one quarter of an inch, a rectangular shape with the plate orientated vertically, the plate having a top and bottom edge with substantially parallel side edges, the top edge connected to said top connecting plate, one of the parallel side edges connected to the load distribution section, the bottom edge connected to the bottom plate,
   c. the load well bottom plate having a structural thickness of at least one quarter of an inch, a shape of a rectangle or square with the shape orientated horizontally, the bottom plate having four edges, with two opposite edges fixed to the bottom edges of the load well side plates, and a third edge fixed to the wheel load distribution section,
   d. whereby the load well bottom plate can share the load from the load carrying support structure member with the load well side plate and the load distribution section.

4. The assembly according to claim 2 wherein the load well is configured to the shape of a rectangular box having a top portion, a bottom portion, and four side portions, the top portion being removed, and one of the side portions being removed, whereby the load caring structure support member can be inserted into the load well through the removed top and side portions.

5. The assembly according to claim 2 wherein the wheeled transport unit is further comprised of an end portion support member lateral fixation assembly, the lateral fixation assembly being comprised of a plurality of through bolts, a plurality of nuts and washers, a fixation region, the fixation region arranged along a lateral axis, the axis extending through the end portion support member and the upper portion of the load distribution section, both the end portion support member and the load distribution section having borings which are at least the diameter of the through bolts, the borings centered along the lateral axis of the fixation region, whereby the through bolts can pass through the fixation region and the washer and nuts can be applied to fixate the load carrying support member to the load distribution section.

6. The assembly according to claim 2 wherein the wheel transport unit having the load well bottom plate is at least 1 inch above the ground.

7. The assembly according to claim 1 wherein the wheel support unit is further comprised of a frame element arranged substantially around a longitudinal axis, a transverse axis, and the vertical axis, the frame element having a support seat substantially comprised to accept the end portion support member, the support seat arranged in a low vertical location, the frame adapted to accept at least two wheel elements, the frame further comprised of load transfer top plates, the load transfer top plates running in the substantially longitudinal direction, the frame additionally comprised of a plurality of vertical section members, the vertical section members providing the required stiffness to resist bending of the frame due to the load carrying structure portion support member, whereas the wheel elements provide support for the frame and transfer load through the wheel elements into the base surface.

8. The assembly according to claim 2 wherein the castor wheels have a plurality of forks arranged along a substantially vertical axis, a top portion of the forks connected to a stay, the stay being connected to a bottom portion of the top connecting plate, the stay having swiveling properties which enable the castor wheel to rotate 360° in the transverse and longitudinal axis, the castor wheels enabling the wheeled transport units to transfer the load carrying structure in any longitudinal or transverse direction.

9. The assembly according to claim 2 wherein the castor wheels can be positioned along the transverse axis, and provide a parked position for the wheeled transport unit, the parked position comprised of a plurality of base engagement points, the base engagement points substantially located at a tangential meeting location between the castor wheel and the base surface and the outer edge of the load well and the base surface, whereby the parked position resists tipping of the wheeled transport unit in the parked position.

10. The assembly according to claim 1 wherein the wheeled transport unit is further adapted to:
   a. be positioned corresponding to the end portion support members by a single individual,
   b. weigh not more than 75 lbs.,
   c. carry the first and second end portion support members and maintain a low separation distance between the first and second end portion support members and the surface of not less than ¼ inch.

11. The assembly according to claim 1 wherein each lifting unit is further comprised of:
   a. a lifting frame element substantially arranged along the transverse and vertical axis of the structure end portion, the lifting frame element having a load carrying section, a plurality of connection sections, a load equalization section, a lifting positioning member, and a Jack element,
   b. the load carrying section arranged along the transverse axis, the load carrying section having substantial strength characteristics to provide lifting of the structure end portion,
   c. the plurality of connection sections each comprised of a sleeve and connection plate, the sleeve permanently fixed to the connection plate, the sleeve adapted to accept the load carrying section, the connection plate adapted to fix to the load carrying structure end portion,
   d. the load equalization section adapted to traverse along the load carrying section and be positioned at a selected lift location relative to either the first or back structure end portions, the selected lift location chosen so that the center of gravity is within a second load carrying region which is defined as an area bounded by two delimiting lines extending from said lift location to the corresponding longitudinally opposite first and second base support locations of either the first or second structure end portions, and a line extending between the first and second base support locations of either the first or second structure end portions, whereby during the lifting of the selected structure end portion the load carrying structure will not tip over,
   e. The lifting positioning member connected to the load equalization section, the lifting positioning member having a containment region wherein the containment region has a top portion and surrounding wall portions with an open bottom portion to accept the Jack element, whereby, the containment region contains the Jack element to avoid slipping of the Jack element out from underneath the load equalization section during the lifting of the structure end portion.

12. The assembly according to claim 1 wherein each lifting unit is further comprised of:
   a. a lifting frame element substantially arranged along the transverse and vertical axis of the first or second structure end portions, the lifting frame element having a load carrying section, a plurality of connection sections, at least two load equalization sections, at least two lifting positioning members, and at least two jack elements,
   b. the load carrying section arranged along the transverse axis, the load carrying section having substantial strength characteristics to provide lifting of the structure end portion,
   c. the plurality of connection sections each comprised of a sleeve and connection plate, the sleeve permanently affixed to the connection plate, the sleeve adapted to accept the load carrying section, the connection plate adapted to affix to the load carrying structure end portion, whereby the load carrying section can move transversely within said sleeves to adjust for varying structure end portion transverse lengths,
   d. the load equalization sections adapted to traverse along the load carrying section and be positioned at selected variable lift locations, including a first selected lift location and a second selected lift location, relative to either the first or second structure end portions, the selected lift locations chosen so that the center of gravity is within a third load carrying region which is defined as generally a trapezoidal area bounded by four delimiting lines, the first delimiting line extending from the first selected lift location to the longitudinally opposite first base support location, the second delimiting line extending from the second lift location to the second longitudinally opposite base support location, the third delimiting line extending between the first and second base support locations of the structure end portion not being lifted, the fourth delimiting line extending between the first and second selected lift locations, whereby during the lifting of the selected structure end portion the load carrying structure will not tip over,
   e. the two lifting positioning members each being connected to one of the two load equalization sections, the lifting positioning member having a containment region where in the containment region has a top portion, a surrounding wall portion, and an open bottom portion, the opened bottom portion adapted to accept the jack element, whereby the containment region contains the jack element to avoid slipping of the jack element as the structure end portion is being lifted.

13. The assembly according to claim 11 wherein the load carrying section is further comprised of:
  a. a transverse length at least long enough to span between the structure end portion first and second support members,
  b. a longitudinal cross-sectional moment of inertia at least great enough to withstand lifting of the structure end portion at the transverse length midpoint.

14. The assembly according to claim 11 wherein the load carrying section is further comprised of:
  a. a tube steel member having a transverse length at least long enough to span between the structure end portion first and second support members, a longitudinal cross-sectional rectangular shape with the vertical walls at least 3 inches long and the top and bottom walls at least 2 inches wide, the wall width at least 3/8 of an inch thick,
  b. a steel strong back bar inserted into the hollow region of the load carrying section, the steel strong back bar having a transverse length at least as long as the tube steel member, and having a longitudinal width of at least one quarter inch with a vertical height of at least 2½ inches, the steel strong back bar fixed along the longitudinal midpoint of the steel tube member, and being connected along the transversal length to the tube steel member.

15. The assembly according to claim 11 wherein the connection section is further comprised of:
  a. a rectangular sleeve and a rectangular connection plate, the rectangular sleeve comprised of a tube steel member having a transverse length at least as long as 3 inches, a vertical height at least as tall as 3½ inches, a longitudinal width at least as long as 2½ inches, the wall width at least 3/16 of an inch thick,
  b. the rectangular connection plate having a vertical length of at least 1 foot, a transverse width of at least 3 inches, and a longitudinal thickness of at least 3/8 of an inch, the rectangular connection plate further having a rectangular sleeve connection position centered transversely and vertically on the connection plate, the connection plate further having a plurality of connection holes, the connection holes positioned outside of the rectangular sleeve connection position and each having a diameter of at least one quarter of an inch, the connection holes positioned such that a connection through bolt can be inserted into the connection hole and through the corresponding structure end portion support member,
  c. the rectangular sleeve connected to the rectangular connection plate at the rectangular sleeve connection position.

16. The assembly according to claim 11 wherein the load equalization section is further comprised of:
  a. a tube steel member comprised of four wall members, including top and bottom horizontal wall members, two vertical side wall members, the vertical side wall members having a height at least as tall as 3½ inches, the horizontal top and bottom wall members having widths at least as wide as 2½ inches, the tube steel member having a transverse length at least as long as 3 inches, the top wall member having a threaded opening centered within the horizontal plane of the top wall section, a threaded set screw configured to join with the threaded opening, the bottom wall member having a containment region connected at the bottom face in the center of the horizontal wall member plane, the containment region comprised of at least a 2 inch inner diameter cup, whereby, after positioning of the load equalization section along the load carrying section, the threaded set screw can be tightened through the threaded opening and against the load carrying section providing securitization of the load equalization section during use, additionally, whereby the containment region contains the jack element to avoid slipping of the jack element during the lifting of the load carrying structure end portion.

17. The wheel support unit according to claim 7 wherein the wheel support unit is further comprised of a longitudinal width of not more than 6 inches.

* * * * *